United States Patent [19]

Lebby et al.

[11] Patent Number: 5,432,630
[45] Date of Patent: * Jul. 11, 1995

[54] OPTICAL BUS WITH OPTICAL TRANSCEIVER MODULES AND METHOD OF MANUFACTURE

[75] Inventors: Michael S. Lebby, Apache Junction; Davis H. Hartman, Phoenix, both of Ariz.

[73] Assignee: Motorola, Inc., Schaumburg, Ill.

[*] Notice: The portion of the term of this patent subsequent to Dec. 14, 2010 has been disclaimed.

[21] Appl. No.: 943,641

[22] Filed: Sep. 11, 1992

[51] Int. Cl.6 .......................... G02B 6/00; H04J 14/00
[52] U.S. Cl. ................................. 359/152; 359/163; 359/173; 359/188; 359/195; 385/14; 385/24; 385/88
[58] Field of Search ............... 359/152, 181, 195, 158, 359/161, 189, 136, 137, 173, 163, 188; 358/1, 4, 12, 14, 24, 88, 147, 76, 54, 55, 15, 77, 78

[56] References Cited

U.S. PATENT DOCUMENTS

| | | | |
|---|---|---|---|
| 4,625,333 | 11/1986 | Takezawa et al. | 359/152 |
| 4,680,810 | 7/1987 | Swartz | 455/609 |
| 4,893,353 | 1/1990 | Iwaoka et al. | 359/181 |
| 4,989,934 | 2/1991 | Zauracky et al. | 359/152 |
| 5,122,893 | 6/1992 | Tolbert | 359/152 |
| 5,125,054 | 6/1992 | Ackley et al. | 385/14 |
| 5,199,087 | 3/1993 | Frazier | 385/14 |
| 5,199,093 | 3/1993 | Longhurst | 385/14 |
| 5,216,238 | 6/1993 | Yoshioka et al. | 359/189 |
| 5,271,083 | 12/1993 | Lebby et al. | 385/14 |
| 5,337,391 | 8/1994 | Lebby | 385/88 |

OTHER PUBLICATIONS

L. Blyler, Jr., G. J. Grimes, R. M. Lien, E. Ysebaert, A Molded Polymeric Resin-Filled Coupler, 41st Electronic Components & Technology Conference May 11-16, 1991 pp. 38 through 43.

L. Blyler, Jr., G. J. Grimes, R. M. Lien, E. Ysebaert, A Molded Polymeric Resin-Filled Coupler, IEEE Transaction on Components, Hybrids, and Manufacturing Technology, vol. 15, No. 4 Aug. 1992, pp. 505-509.

*Primary Examiner*—Hezron E. Williams
*Assistant Examiner*—Richard Moller
*Attorney, Agent, or Firm*—Eugene A. Parsons

[57] ABSTRACT

An optical bus including two identical transceiver modules each including transmitter and receiver circuitry and light detectors and light generators. The light detectors and generators are coupled, optically, to the ends of an optical fiber ribbon by a molded waveguide and, electrically, to the transmitter or receiver by conductors in a mounting board. The receiver circuitry contains a burst mode, non-linear receiver and the transmitter contains CMOS circuits to increase the simplicity and speed of the module.

27 Claims, 5 Drawing Sheets

OPTICAL BUS WITH OPTICAL TRANSCEIVER MODULES AND METHOD OF MANUFACTURE

The present invention pertains to an improved optical bus and more specifically to improved transceiver modules for use with an optical bus.

BACKGROUND OF THE INVENTION

Today we live in the midst of an information explosion. The rapid development of computing and telecommunications technologies in the 1980's has served as a gateway to an entirely new world. In spite of the ever increasing capacity for storing and retrieving information, demand for that capacity seems to increase in lockstep. The growth of personal computing and personal communications systems will further fuel this need well into the twenty first century. As the demand for information capacity grows, so does the need to transport that data. Computer designers no longer have the luxury of treating the interconnect as an afterthought to their computer design process.

Presently, fiber optics industries have established market share in telecommunications and are beginning to penetrate the Local Area Network (LAN) markets. However, these industries still carry the high cost structure associated with telecommunications solutions. This high cost structure has prevented the successful penetration of optics into the very high volume interconnect markets associated with the desktop computer industry.

The underlying pattern of the desktop market today is a respectable growth rate in a market dominated by copper cable operating with limited bandwidth capability. As computers become more powerful the demand for inexpensive high performance interconnects will increase. For example, it is expected that when high resolution monitors reach the market in 1-2 years, the demand for an inexpensive, high performance interconnect will rise significantly.

Fiber optic technology was, at its inception in the late 1960's, faced with the challenge of penetrating the electronics marketplace. When optical fiber loss was dramatically reduced to less than 1 db/Km in the late 1970's, the opportunity to begin to replace costly copper transmission lines with a single optical fiber emerged. Transmission of many telephone calls over long unrepeated distances could ultimately lead to significant reduction in a system's cost per channel-mile. Because telecommunications systems costs are driven largely by cable cost, the fiber solution could be implemented without regard to the cost of the electro-optic interfaces. A major consequence of this situation is the very high cost of manufacturing these interfaces, even today.

The introduction of fiber optic communications into computer systems has lagged far behind the usage fiber optics have seen in the telecommunications industries. This should not be surprising, since the cost-per channel mile figure of merit which originally drove fiber optics is not as important in the computer industry. Instead, computer designs are driven by the need to produce low cost, high performance information processing systems and equipment. Hardware-related issues are mostly packaging and interconnect related. While these issues have always held high priority for computer equipment manufacturers, only recently have they taken a slightly different flavor. With the speed of microprocessors now rapidly being pushed into and beyond the 100 Mb/s region, it is becoming very difficult to separate the circuit design-fabrication issues from the packaging-interconnect issues. Instead, packages and their interconnections are an inseparable part of circuits.

Computer processing speeds have enjoyed a steady and impressive growth during the last decade, and are expected to continue that trend even though significant technical problems are involved. As computers become more complex, additional interconnect complexity follows, leading to more constrained degrees of freedom in system design. Questions are routinely asked if for example, back-planes or motherboards are really necessary, and at what cost-performance do they make sense. Issues like system partitioning which demands innovative design for the extra degree of freedom it generates must be solved.

SUMMARY OF THE INVENTION

It is a purpose of the present invention to provide a new and improved optical bus with optical transceiver modules and method of manufacture.

It is a further purpose of the present invention to provide a new and improved optical bus with optical transceiver modules and method of manufacture which is relatively simple and inexpensive to manufacture.

It is a further purpose of the present invention to provide a new and improved optical bus with optical transceiver modules with a greatly increased speed and bandwidth over present wire interconnects.

It is a further purpose of the present invention to provide a new and improved optical bus with optical transceiver modules which can be utilized as computer interconnects and will provide additional degrees of freedom to computer manufacturers.

The above described problems are at least partially solved and the purposes realized by an optical transceiver module including a light detector having an optical input and an electrical terminal positioned on a first surface thereof, a light generator having an optical output and an electrical terminal positioned on a first surface thereof, an optical waveguide including a plurality of spaced apart light conducting cores each having first and second ends optically accessible at opposite ends of the waveguide, a plurality of electrical conductors each being associated with a different one of the plurality of cores and having an externally accessible contact positioned in a first end of the waveguide adjacent the first end of the associated core and an externally accessible portion positioned on an external surface of the optical waveguide, the waveguide further having a plurality of alignment ferrules formed in a second end of the waveguide opposite the first end, the light detector being affixed to the end of the waveguide with the optical input substantially aligned with the first end of a first core of the plurality of cores and the electrical terminal in electrical contact with the externally accessible contact of the electrical conductor associated with the first core, the light generator being affixed to the end of the waveguide with the optical output substantially aligned with the first end of a second core of the plurality of cores and the electrical terminal in electrical contact with the externally accessible contact of the electrical conductor associated with the second core, a first integrated circuit including a transmitter with electrical input and output terminals, a second integrated circuit including a receiver with electrical input and output terminals, an electrical interconnect and mounting board including a first mounting area having the optical waveguide mounted thereon with the second end of the waveguide being positioned adjacent an external edge of the board and facing outwardly therefrom, a second mounting area having the first integrated circuit mounted thereon and including electrical conductors extending from adjacent the first mounting area to adjacent the second mounting area, and a third mounting area having the second integrated circuit mounted thereon and including electrical conductors extending from adjacent the first mounting area to adjacent the third mounting area, the board further including electrical input and output terminals, and the electrical conductors extending from adjacent the first mounting area to adjacent the second mounting area being connected in electrical contact with the electrical output terminal of the transmitter and the externally accessible portion of the electrical conductor associated with the first core, and the electrical input terminal of the transmitter being connected in electrical contact with an input terminal of the electrical interconnect and mounting board, the electrical conductors extending from adjacent the first mounting area to adjacent the third mounting area being connected in electrical contact with the electrical input terminal of the receiver and the externally accessible portion of the electrical conductor associated with the second core, and the electrical output terminal of the receiver being connected in electrical contact with an output terminal of the electrical interconnect and mounting board.

Further, the above described problems are at least partially solved and the purposes realized by a method of manufacturing the above described optical transceiver module.

BRIEF DESCRIPTION OF THE DRAWINGS

Referring to the drawings.

DESCRIPTION OF THE PREFERRED EMBODIMENTS

Figure 1:
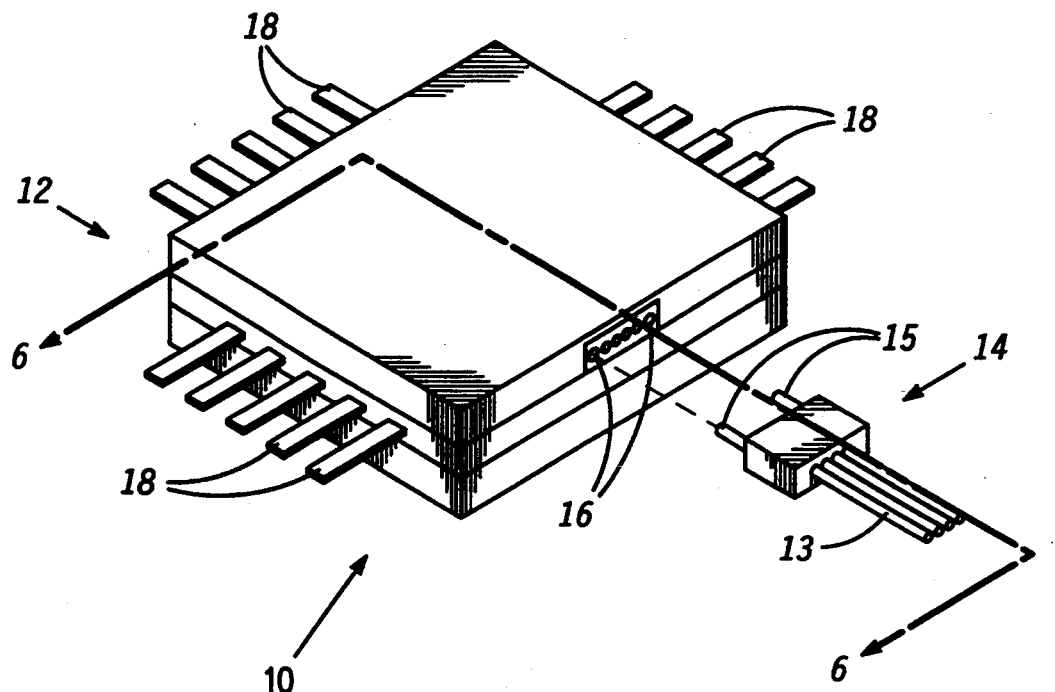
FIG. 1 is a view in perspective of an optical bus with optical transceiver module, portions thereof removed, incorporating the present invention.

Referring specifically to FIG. 1, a view in perspective of an optical bus 10 with optical transceiver module 12, portions thereof removed, incorporating the present invention is illustrated. Optical bus 10 further includes a second module (not shown) which is identical to transceiver module 12 and an optical fiber ribbon 13 with a connector 14 at each end (only one end of which is shown). Connector 14 includes a pair of outwardly extending pins 15 designed to be engaged within alignment ferrules 16 in one edge of transceiver module 12. Pins 15 align a plurality of optical channels within optical ribbon 13 and connector 14 with optical inputs/outputs positioned between alignment ferrules 16. It should be understood that generally connector 14 will be formed with ferrules also, and the ends of the optical channels will be polished for substantially gap-free mating with the optical inputs/outputs in module 12. Pins 15 are then inserted and anchored in either the ferrules in connector 14 or in module 12.

Transceiver module 12 also has a plurality of electrical inputs/outputs 18 positioned in the remaining edges thereof. While electrical inputs/outputs 18 are illustrated in this specific embodiment as leads, such as a copper lead frame, it will be apparent to those skilled in the art that the electrical inputs/outputs could be any convenient type of terminal, such as conductive epoxy bumps, solder bumps, or J-leads for surface mounting, or any of the commonly used leads for through board mounting.

Figure 2:
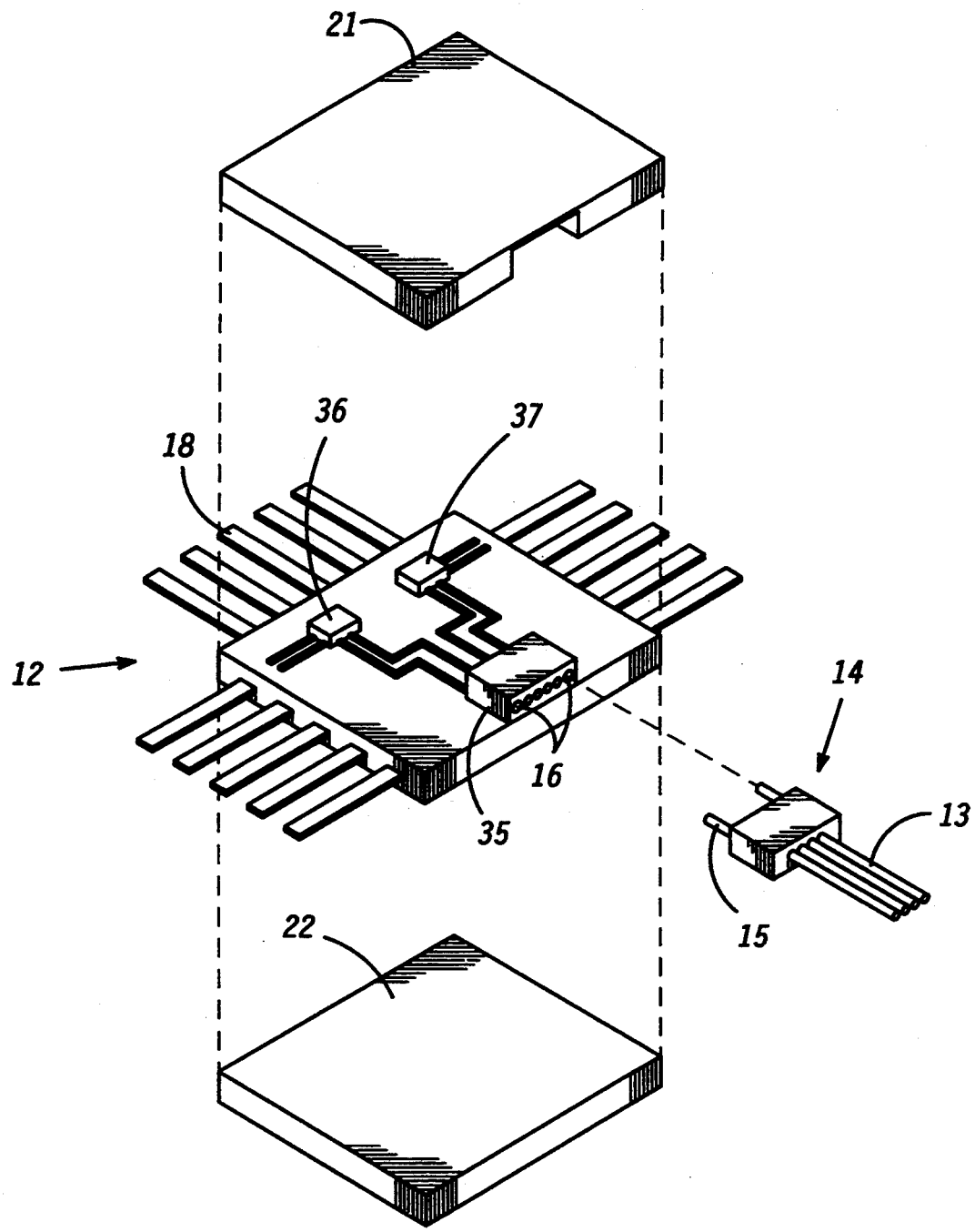
FIG. 2 is an exploded view in perspective of the optical transceiver module illustrated in FIG. 1.

FIG. 2 is an exploded view in perspective of transceiver module 12 with upper and lower plastic over molding portions 21 and 22, respectively, removed to illustrate the inner components. While over molding portions 21 and 22 are utilized herein to encapsulate the inner components of transceiver module 12, it will be understood by those skilled in the art that many different types of encapsulation might be utilized, depending upon the specific application, environment, etc.

Figure 3:
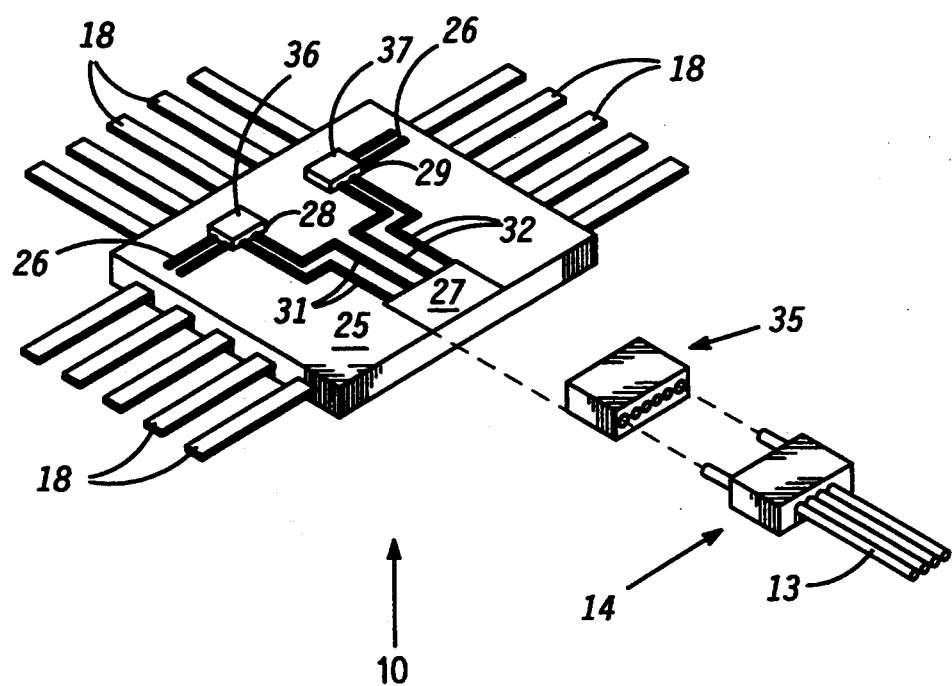
FIG. 3 is an exploded view in perspective of a portion of the optical transceiver module illustrated in FIG. 2.

Referring specifically to FIG. 3, an enlarged view in perspective of the inner components of transceiver module 12 is illustrated. An electrical interconnect and mounting board 25 is provided for mounting the various components to be described. Board 25 may be as simple as a standard silver plated copper flag or a printed circuit board or, as in the present embodiment, it may be a multilayer laminated board designed to have mounted thereon a plurality of integrated circuit chips. The leadframe forming electrical inputs/outputs 18 is conveniently incorporated into the laminations and electrically connected to electrical conductors 26 on the upper surface of board 25 in any of the well known ways. Board 25 has three different mounting areas 27, 28 and 29 defined thereon with electrical conductors 31 extending between mounting area 27 and 28 and electrical conductors 32 extending between mounting areas 27 and 29.

In this specific embodiment an optical interface 35 is fixedly mounted on board 25 at mounting area 27 and integrated circuits 36 and 37 are fixedly mounted on board 25 at mounting areas 28 and 29, respectively. Optical interface 35 includes all of the optical/electrical and electrical/optical conversion circuits and, therefore, separates all of the tight optical alignment problems from the rest of transceiver module 12. Also, in this embodiment integrated circuits 36 and 37 are packaged for direct mounting by means of conductive epoxy bumps but it will be understood that any convenient means of mounting and connection to electrical conductors 26, 31 and 32 may be utilized. Integrated circuit 36 includes transmitter circuitry for driving light generators contained in optical interface 35 in accordance with signals received at electrical inputs/outputs 18. Integrated circuit 37 contains receiver circuitry for receiving electrical signals generated by optical detectors contained in optical interface 35 in response to light signals received by optical interface 35. Two separate integrated circuits 36 and 37 are utilized for convenience of this description but it should be understood that the two integrated circuits could be contained in a single semiconductor chip.

Figure 4:
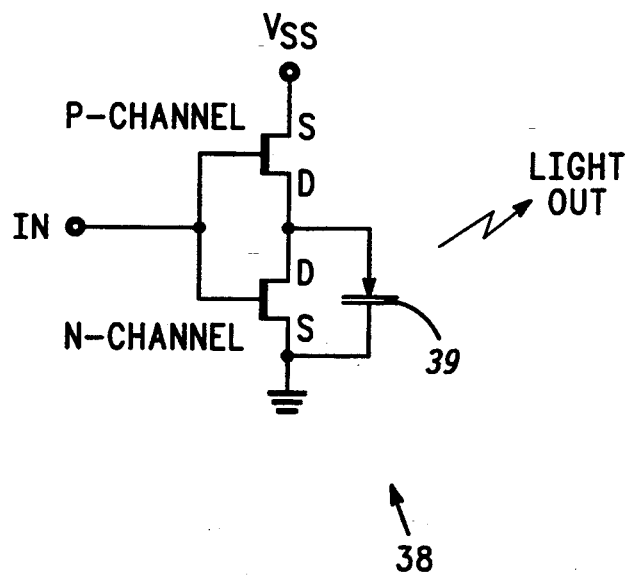
FIG. 4 is a schematic representation of a typical CMOS circuit.

Referring specifically to FIG. 4, schematic representation of a typical CMOS gate circuit 38 is illustrated. Generally, CMOS is a complementary configuration of transistors consisting of P-channel devices connected to N-channel devices. In gate circuit 38, the drains are connected together providing the output to a light generator, such as a vertical cavity surface emitting laser 39 (VCSEL), and the gates are connected together forming the input. In this configuration, when the input is low, the N-channel device is off and the P-channel device is on. Consequently the output is driven high, sourcing current into VCSEL 39, a low impedance load. Similarly when the input is high, the N-channel device is on and the P-channel device is off. The output is then driven low, approaching ground. Thus, one of the transistors is off for both states of the input to the inverter. Only a small current flows in either of these states. A significant current flows only during the transition from high to low or low to high. The result is that the static power dissipation is much lower than in previous optical transmitter designs.

CMOS gate circuit 38 is utilized in the transmitter included in integrated circuit 36 because it can directly drive light generators, such as VCSEL 39, without the need for complicated, custom transmitter circuitry. By utilizing, for example, ultra-low threshold VCSELs (<10 ma), the requirement to monitor the output of the laser with a photodetector (as in past laser circuits) is no longer necessary and complicated feedback circuits to maintain the laser output constant can now be eliminated. In addition to the fact that gate circuit 38 is extremely simple, it is utilized because of the speed of the circuit and the low power utilized.

When a CMOS gate circuit is connected directly to an ultra-low threshold laser diode (such as a VCSEL or a multi-quantum well edge emitting laser with high reflection coatings), the optical output of such devices can be dithered by the current switching characteristics of the CMOS gate circuit. No pre-bias of the laser is required under these circumstances, so that standard CMOS digital components can be connected directly to the laser with no more than a single series resistor (for current limiting). This concept, referred to herein as "direct drive", greatly simplifies the transmitter circuits and significantly enhances the method of manufacture for optical bus 10 and optical transceiver module 12. In a preferred embodiment of the transmitter circuit, CMOS gate circuit 38 includes a CMOS hex-inverter integrated circuit, such as the MC74AC04N commercially available from MOTOROLA, Inc. Direct drive of the light generators from ECL off-the-shelf components can also be utilized to simplify the transmitter circuit. An example of an ECL off-the-shelf component which can be utilized is the ECLinPS series MC10E107FN exclusive OR gate available from MOTOROLA Inc.

Thus, each optical channel associated with the transmitter circuitry is capable of transmitting data at a speed initially determined by a CMOS gate, (which presently is at a 150 Mb/s transmission rate with the 1.2 um ACT series of gates manufactured by MOTOROLA, Inc.), so that bus 10 can supply from a few Mb/s to more than 1 Gb/s of parallel data transfer depending upon the specific CMOS version available. This range of data transfer makes bus 10 particularly suitable for use in next generation high-end desk top computers which are looking for high data rates at low cost and upgradability. It should also be noted that as improved CMOS, or other types of circuitry, become available, systems utilizing optical bus 10 can simply install new transceiver modules incorporating the upgrades and the manufacturer of the transceiver modules has simply to utilize the upgraded integrated circuits in his assembly process to produce upgraded transceiver modules.

Figure 5:
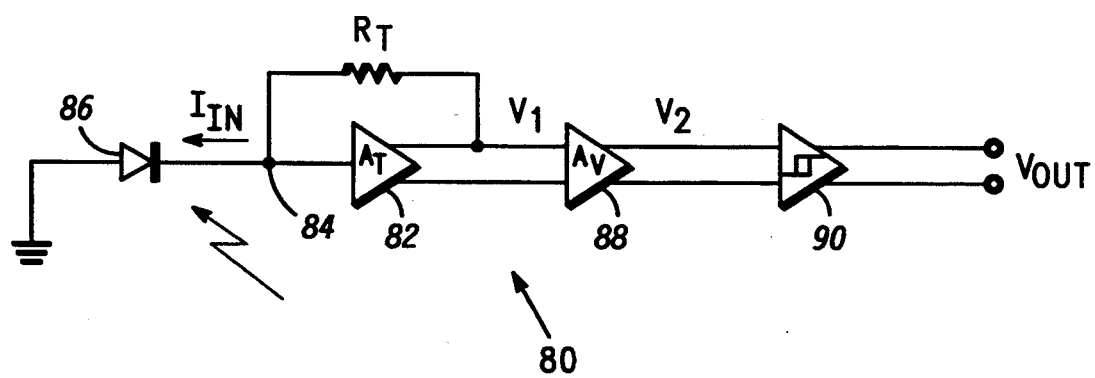
FIG. 5 is a schematic/block diagram of a burst mode data receiver.

Referring specifically to FIG. 5, a schematic/block diagram of a burst mode data receiver 80 embodying the present invention is illustrated. Burst mode data receiver 80 includes an input stage 82, which in this embodiment is a transimpedance amplifier, having an input terminal 84 constructed to receive non-linear input signals. In this example, input terminal 84 has a photo diode 86 connected thereto, which diode 86 supplies binary signals to input terminal 84 in response to light impinging thereon. Burst mode data receiver 80 further includes an amplifier 88 and a hysteresis stage 90. Input stage 82, amplifier 88 and hysteresis stage 90 are all direct coupled with no coupling capacitors required because, as will be more apparent presently, DC inputs have no effect on burst mode data receiver 80. Signals supplied at input terminal 84 are current signals and output signals from hysteresis stage 90 are amplified voltage replicas of the input current signals.

Input currents produce a switching action in circuit 82 between a pair of transistors (not shown), which essentially differentiates the input signal. The differentiating action of stage 82 results in output pulses being produced at the outputs thereof. The output pulses from input stage 82 are applied to amplifier 88 which in this specific embodiment is a differential amplifier. By utilizing a differential amplifier as amplifier 88, the common mode properties of signals applied thereto are removed and a true differential signal is produced. Amplifier 88 can include as many separate amplifying stages as are required for the specific application. Because the output signals of amplifier 88 are generated from the front and back edges of the input signals, pulse width distortion is virtually eliminated.

This method and apparatus for producing non-pulse width distorted output signals has the additional advantage of being able to track input signals from less than one microampere to greater than one milliampere, which is a dynamic range of greater than a factor of three decades or b 60 db (RF). Further, the bandwidth of input stage 82 is not critical, linearity is not needed and very slow signals can be tracked.

In this embodiment of hysteresis stage 90, internal resistors (not shown) provide a positive feedback from the output to the input which latches the circuit in one or the other of two output states or logic levels. Internal resistors (not shown) also establish an offset voltage which must be exceeded by input signals before switching between the two output states or logic levels occurs. The values of the internal resistors can be changed in various applications to change the offset voltage to suit the application. Because of the latching function of hysteresis stage 90, the output is always latched in one of the possible output states, even when there is no input signal. Thus, it is not necessary to include complicated circuitry for detecting the center point of input signals and centering the output signals around the input signals or providing an input offset voltage or current signal.

Hysteresis stage 90 provides a number of advantages to burst mode data receiver 80 including the advantage of having a latched output with no input signal. Further, hysteresis stage 90 provides output signals with faster rise and fall times because once hysteresis stage 90 is triggered the output switches states, with the switching time depending only upon the components of hysteresis stage 90. Also, the offset is generally set to be well above noise and other interference signals in the system so that only true data signals will trigger hysteresis stage 90. As previously mentioned, because of the novel hysteresis stage 90 linearity in the previous stages is not a requirement. A clock may be easily incorporated into burst mode data receiver 80, and, especially hysteresis stage 90, to provide clocked output signals, if desired.

Figure 6:
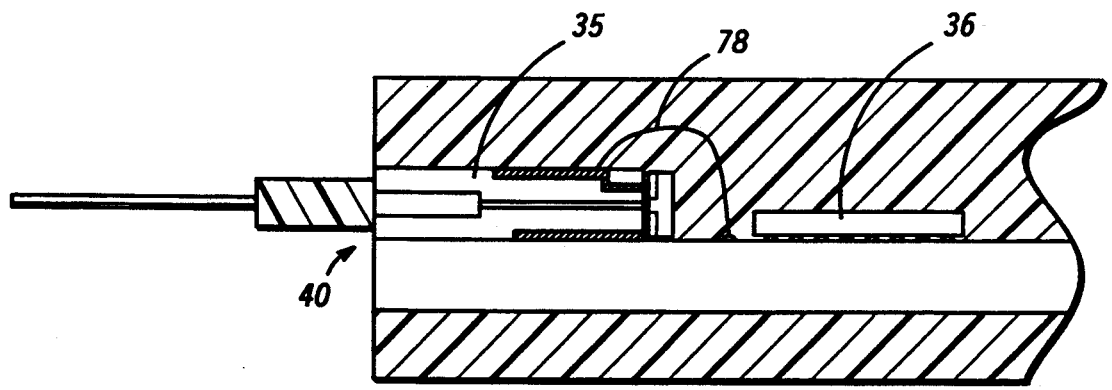
FIG. 6 is a sectional view, portions thereof broken away, of a potion of the optical transceiver module as seen from the line 6—6 in FIG. 1.
Figure 7:
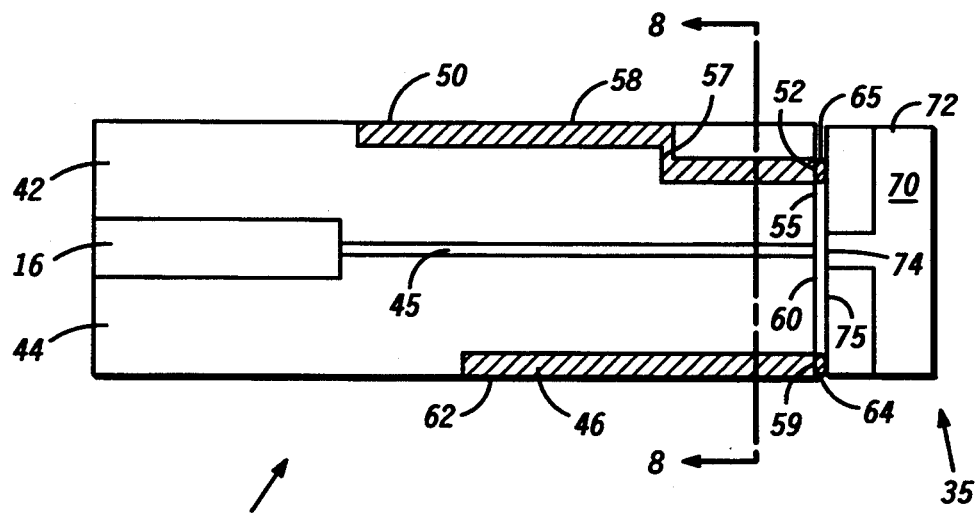
FIG. 7 is a greatly enlarged sectional view of a portion of FIG. 6.
Figure 8:
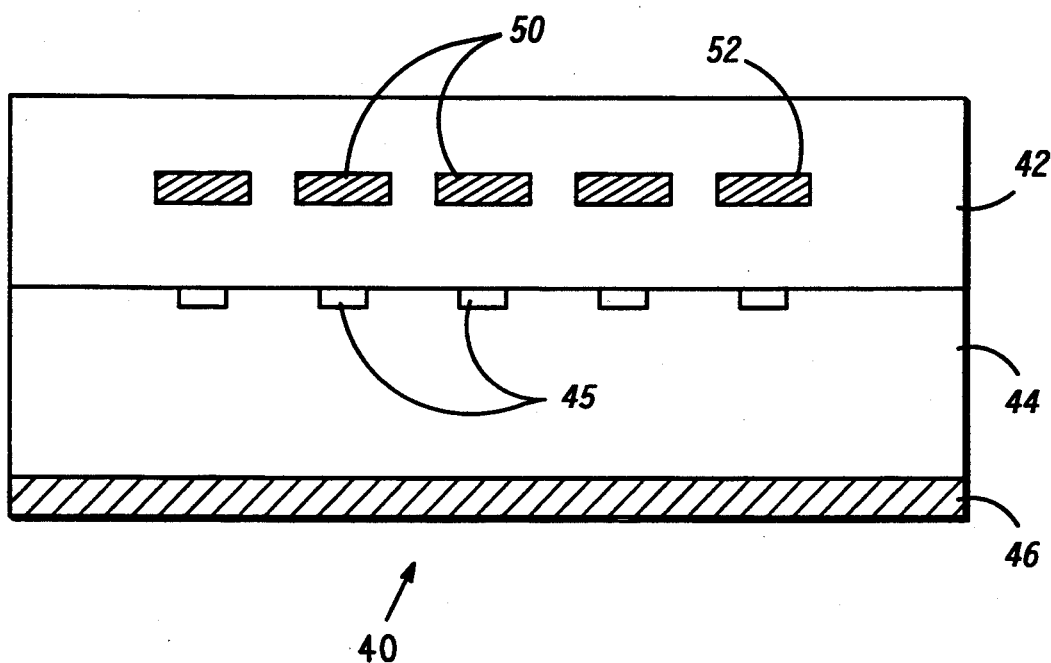
FIG. 8 is a cross-sectional view of the portion of FIG. 6, as seen from the line 8—8 in FIG. 7.

FIG. 6 is a sectional view, portions thereof broken away, of a portion of the optical transceiver module as seen from the line 6—6 in FIG. 1. In this preferred embodiment optical interface 35 includes a molded optical waveguide 40, which can be seen in more detail in FIGS. 7 and 8. FIG. 7 is a greatly enlarged sectional view of optical interface 35 and of molded waveguide 40. FIG. 8 is a cross-sectional view of molded waveguide 40 as seen from the line 8—8 in FIG. 7.

Molded waveguide 40 is made of first cladding layer 42, second cladding layer 44, and cores 45. Second cladding layer 44 is molded with axially extending channels in the inner surface thereof, which channels are designed to receive unprocessed core material therein. Typically, the inner surfaces of molded first cladding layer 42 and molded second cladding layer 44 are joined by an optically transparent material which forms cores 45 of waveguide 40 and acts as an adhesive and an optically transparent polymer. The optically transparent material generally may be any of several materials, such as epoxies, plastics, polyimides, or the like. Generally, refractive indexes of these optically transparent materials range from 1.54 to 1.58. It should be understood that to form an optical waveguide the refractive index of cores 45 should be at least 0.01 greater than the refractive index of cladding layers 42 and 44.

In this specific embodiment of molded waveguide 40, epoxy is used to join the inner surface of first cladding layer 42 to the inner surface of second cladding layer 44. Application of the epoxy is done in a manner so as to completely fill the channels of first cladding layer 42, thereby forming cores 45. Further, by having cores 45 completely surrounded by cladding layers 42 and 44, cores 45 have superior performance characteristics for conducting light or light signals. These superior performance characteristics are used in enhancing high speed communications applications, such as chip-to-chip communications, board-to-chip communications, board-to-board communications, computer-to-computer communications, and the like. Additionally, a capability is available, in molded waveguide 40, to match refractive indexes of cladding layers 42 and 44.

In addition, second cladding layer 44 has a ground plane, or ground conductor, 46 affixed to the lower surface thereof. Also, a plurality of electrical conductors 50, in this embodiment one for each core 45, are molded into first cladding layer 42. Electrical conductors 50 are, for example, provided in the form of a flexible leadframe, which leadframes are well known in the semiconductor art. Ground conductor 46 and conductors 50 are formed of any convenient electrically conducting material, such as copper, aluminum, gold, silver, etc.

As can be seen especially in FIGS. 7 and 8, electrical conductors 50 are molded into first cladding layer 42 and each have a first end forming an electrically accessible contact 52 in end 55 of molded optical waveguide 40. Electrical conductors 50 extend into the bulk of first cladding layer 42 and are bent at 57 with two generally ninety degree bends so that a portion 58 of each electrical conductor 50 lies in the upper surface of first cladding layer 42 and is available for external electrical connections thereto. The position of portion 58 in the upper surface of first cladding layer 42 depends upon the specific application and the position and type of external electrical connections to be made.

Ground conductor 46 may be molded into, or along with, cladding layer 44, or it may be deposited on cladding layer 44 after the formation thereof. Further, while ground conductor 46 is referred to as a ground plane in this specific embodiment it will be understood by those skilled in the art that in some special applications ground conductor 46 may be molded into second cladding layer 44 and may include a plurality of individual conductors similar to electrical conductors 50. In either case, ground conductor 46 generally includes an externally accessible electrical contact 59 positioned in an end 60 of second cladding layer 44, which end 60 lies in a plane with end 55 of first cladding layer 42, both of which define a first end of optical waveguide 40. Also, ground conductor 46 generally includes an externally accessible electrical portion 62 lying in an external surface of second cladding layer 44.

An optical array 70 is illustrated affixed to the first end of optical waveguide 40, which optical array 70 includes at least one light detector and one light generator. In this specific embodiment optical array 70 contains twenty optical devices 72. Optical devices 72 can be any of the devices known in the art which detect or generate light, or any combination thereof, such as light detecting diodes, light emitting diodes, vertical cavity surface emitting lasers, any of the other known lasers, field emission devices, etc. Each optical device 72 includes an optical input/output 74 positioned in a surface 75 of optical array 70. Each of the optical input/outputs 74 is aligned with a different one of the cores 45 so that light travelling down aligned core 45 enters input/output 74 of optical device 72 or light generated by optical device 72 leaves input/output 74, enters aligned core 45 and is conducted thereby to the opposite end.

Each optical device 72 has a pair of spaced apart electrical terminals positioned in surface 75 of optical array 70 so that one of the terminals connects to contact 52 adjacent, or associated with, aligned core 45 and the other terminal connects to contact 59 of ground conductor 46. The electrical terminals of each optical device 72 are connected to the contacts 52 and 59 adjacent to, or associated with, the aligned core 45 at 64 and 65 (see FIG. 7) by means of a weld or reflowable connection material such as conductive epoxy, solder, solder paste, etc. Generally, since electrical conductors 50 are molded into cladding layer 42 and ground conductor 46 is molded into, or deposited on the surface of, cladding layer 44 the positioning of contacts 52 and 59 is sufficiently accurate to allow satisfactory alignment of optical input/outputs 74 with cores 45 utilizing normal robotics. By simply aligning the pair of terminals of each optical device 72 to contacts 52 and 59 while simultaneously using the upward and downward visual system in a pick 'n place die/robot, tight ±0.1 mil (or ±2 microns) placement can be achieved. The affixing can also be performed manually if convenient.

Once optical array 70 is physically and electrically affixed to optical waveguide 40, optical interface 35 is surface mounted on board 25. Electrical connections to optical devices 72 are made by some convenient means such as wire bonding 78 (see FIG. 6) between externally accessible portions 58 and contacts, or bonding pads, on board 25. In general a single contact to ground conductor 46 provides a connection to the opposite side of all of optical devices 72. Thus, each of the twenty optical devices 72 is connected to either the transmitter circuitry in integrated circuit 36 through electrical conductor 31 or the receiver circuitry in integrated circuit 37 through electrical conductor 32. With all of the components fixedly mounted on board 25, the assembly is encapsulated by some convenient means, such as plastic over molding utilizing upper and lower plastic over molding portions 21 and 22. During the encapsulation procedure it is necessary to insure the accessibility of ferrules 16 and the ends of cores 45.

Optical inputs/outputs are carried by cores 45 of optical waveguide 40 between the optical inputs/outputs of optical devices 72 and the optical channels within optical ribbon 13 and connector 14. The twenty optical channels within optical ribbon 13 and connector 14 are aligned with cores 45 of optical waveguide 40 by engaging pins 15 of connector 14 in ferrules 16 of optical waveguide 40. Generally, connector 14 is retained in connection with optical transceiver module 12 by means of a press-snap locking mechanism (not shown). In this specific embodiment, twenty channels are utilized, eight of which are for transmission of optical signals from transceiver module 12, eight of which are for transmission of optical signals to transceiver module 12 and four additional channels for clock signals, parity and handshaking. While twenty channels are utilized herein for the parallel transmission, and reception, of eight bits of data, it will be understood by those skilled in the art that more or less channels could be utilized if desired.

At present, an International Optical Standard dictates sizes, spacing of channels, etc. in optical connectors. Because this standard is limited in the number of channels included in an optical connector, it may be more convenient to manufacture a twenty channel (or greater) connector by including a number of standardized smaller connectors. For example, in the present embodiment of twenty channels it is convenient to utilize two standard ten channel optical connectors and couple them together with a flexible material that allows the simultaneous coupling of the two connectors to optical transceiver module 12.

Thus, optical bus 10, including transceiver module 12, is an easily manufactured alternative to the present day electrical buses. Besides being relatively inexpensive and simple to manufacture, the bandwidth and data carrying capacity of optical bus 10 are substantially greater than electrical buses with a similar number of channels. Further, if utilized properly, the optical alternative can open new partitioning options to the computer designer. Also, with new partitioning options the manufacturers will have new packaging options.

While we have shown and described specific embodiments of the present invention, further modifications and improvements will occur to those skilled in the art. We desire it to be understood, therefore, that this invention is not limited to the particular forms shown and we intend in the append claims to cover all modifications that do not depart from the spirit and scope of this invention.

What is claimed is:
1. An optical transceiver module comprising:
   a light detector having an optical input and an electrical terminal positioned on a first surface thereof;
   a light generator having an optical output and an electrical terminal positioned on a first surface thereof;
   an optical waveguide including a plurality of spaced apart light conducting cores each having first and second ends optically accessible at opposite ends of the waveguide, a plurality of electrical conductors each being associated with a different one of the plurality of light conducting cores and each having an externally accessible electrical contact positioned in a first end of the waveguide adjacent the first end of the associated light conducting core and an externally accessible portion positioned on an external surface of the optical waveguide, the waveguide further having a plurality of alignment ferrules formed in a second end of the waveguide opposite the first end;
   the light detector being affixed to the first end of the waveguide with the optical input substantially aligned with the first end of a first light conducting core of the plurality of light conducting cores and the electrical terminal in electrical contact with the externally accessible electrical contact of the electrical conductor associated with the first light conducting core;
   the light generator being affixed to the first end of the waveguide with the optical output substantially aligned with the first end of a second light conducting core of the plurality of light conducting cores and the electrical terminal in electrical contact with the externally accessible electrical contact of the electrical conductor associated with the second light conducting core;
   a first integrated circuit including a transmitter with electrical input and output terminals;
   a second integrated circuit including a receiver with electrical input and output terminals;
   an electrical interconnect and mounting board including a first mounting area having the optical waveguide mounted thereon with the second end of the waveguide being positioned adjacent an external edge of the board and facing outwardly therefrom, a second mounting area having the first integrated circuit mounted thereon and including electrical conductors extending from adjacent the first mounting area to adjacent the second mounting area, and a third mounting area having the second integrated circuit mounted thereon and including electrical conductors extending from adjacent the first mounting area to adjacent the third mounting area, the board further including electrical input and output terminals; and
   the electrical conductors extending from adjacent the first mounting area to adjacent the second mounting area being connected in electrical contact with the electrical output terminal of the transmitter and the externally accessible portion of the electrical conductor associated with the first light conducting core, and the electrical input terminal of the transmitter being connected in electrical contact with an electrical input terminal of the electrical interconnect and mounting board, the electrical conductors extending from adjacent the first mounting area to adjacent the third mounting area being connected in electrical contact with the electrical input terminal of the receiver and the externally accessible portion of the electrical conductor associated with the second light conducting core, and the electrical output terminal of the receiver being connected in electrical contact with an electrical output terminal of the electrical interconnect and mounting board.

2. An optical transceiver module as claimed in claim 1 wherein the light detector and light generator are provided in a single unit.

3. An optical transceiver module as claimed in claim 1 wherein the first and second integrated circuits are provided on a single semiconductor chip.

4. An optical transceiver module as claimed in claim 1 wherein the transmitter includes a CMOS gate circuit.

5. An optical transceiver module as claimed in claim 4 wherein the light generator includes an ultra-low threshold laser and the CMOS gate circuit included in the transmitter is connected directly to the ultra-low threshold laser.

6. An optical transceiver module as claimed in claim 1 wherein the receiver in the second integrated circuit includes an input stage having an input terminal for receiving non-linear input signals and an output terminal supplying output signals indicative of the front and rear edges of non-linear input signals received, an amplifier coupled to receive the output signals from the input stage and provide amplified output signals at an output terminal thereof, and a hysteresis stage coupled to receive the amplified output signals from the output terminal of the amplifier and regenerate an amplified replica of the non-linear input signals.

7. An optical transceiver module comprising:
  a light detector having an optical input and an electrical terminal positioned on a first surface thereof;
  a light generator having an optical output and an electrical terminal positioned on a first surface thereof;
  an optical waveguide including a first cladding layer, a second cladding layer affixed in overlying relationship on the first cladding layer, a plurality of spaced apart light conducting cores positioned between the first and second cladding layers and substantially surrounded thereby, the light conducting cores each having first and second ends optically accessible at opposite ends of the waveguide, a plurality of electrical conductors formed in the first cladding layer and each electrical conductor being associated with a different one of the plurality of light conducting cores and having an externally accessible electrical contact positioned in a first end of the waveguide adjacent the first end of the associated light conducting core and an externally accessible portion positioned on an external surface of the first cladding layer, the waveguide further having a plurality of alignment ferrules formed in a second end of the waveguide opposite the first end;
  the light detector being affixed to the first end of the waveguide with the optical input substantially aligned with the first end of a first light conducting core of the plurality of light conducting cores and the electrical terminal in electrical contact with the externally accessible electrical contact of the electrical conductor associated with the first light conducting core;
  the light generator being affixed to the first end of the waveguide with the optical output substantially aligned with the first end of a second light conducting core of the plurality of light conducting cores and the electrical terminal in electrical contact with the externally accessible electrical contact of the electrical conductor associated with the second light conducting core;
  a first integrated circuit including a transmitter with electrical input and output terminals;
  a second integrated circuit including a receiver with electrical input and output terminals;
  an electrical interconnect and mounting board including a first mounting area having the optical waveguide mounted thereon with the second end of the waveguide being positioned adjacent an external edge of the board and facing outwardly therefrom, a second mounting area having the first integrated circuit mounted thereon and including electrical conductors extending from adjacent the first mounting area to adjacent the second mounting area, and a third mounting area having the second integrated circuit mounted thereon and including electrical conductors extending from adjacent the first mounting area to adjacent the third mounting area, the board further including electrical input and output terminals; and
  the electrical conductors extending from adjacent the first mounting area to adjacent the second mounting area being connected in electrical contact with the electrical output terminal of the transmitter and the externally accessible portion of the electrical conductor associated with the first light conducting core, and the electrical input terminal of the transmitter being connected in electrical contact with an electrical input terminal of the electrical interconnect and mounting board, the electrical conductors extending from adjacent the first mounting area to adjacent the third mounting area being connected in electrical contact with the electrical input terminal of the receiver and the externally accessible portion of the electrical conductor associated with the second light conducting core, and the electrical output terminal of the receiver being connected in electrical contact with an electrical output terminal of the electrical interconnect and mounting board.

8. An optical transceiver module as claimed in claim 7 including in addition a reference electrical conductor formed in the second cladding layer with an externally accessible electrical contact positioned in the end of the waveguide adjacent the first end of the light conducting core and an externally accessible portion positioned on an external surface of the second cladding layer and the light detector and light generator each have a reference terminal positioned on the first surface thereof and in electrical contact with the externally accessible electrical contact of the reference electrical conductor.

9. An optical transceiver module as claimed in claim 7 wherein the light generator includes a vertical cavity surface emitting laser.

10. An optical transceiver module as claimed in claim 7 wherein the transmitter included in the first integrated circuit is a single gate circuit with the electrical output terminal direct coupled to the electrical terminal of the light generator.

11. An optical transceiver module as claimed in claim 7 wherein the receiver included in the second integrated circuit is a non-linear burst mode data receiver.

12. An optical transceiver module as claimed in claim 11 wherein the receiver includes an input stage having an input terminal for receiving non-linear input signals and an output terminal supplying output signals indicative of the front and rear edges of non-linear input signals received, an amplifier coupled to receive the output signals from the input stage and provide amplified output signals at an output terminal thereof, and a hysteresis stage coupled to receive the amplified output signals from the output terminal of the amplifier and regenerate an amplified replica of the non-linear input signals.

13. An optical module comprising:
a light detector having an optical input and an electrical terminal positioned on a first surface thereof;
an optical waveguide including a first cladding layer, a second cladding layer affixed in overlying relationship on the first cladding layer, a light conducting core positioned between the first and second cladding layers and substantially surrounded thereby, the light conducting core having first and second ends optically accessible at opposite ends of the waveguide, an electrical conductor formed in the first cladding layer and having an externally accessible electrical contact positioned in a first end of the waveguide adjacent the first end of the light conducting core and an externally accessible portion positioned on an external surface of the first cladding layer, the waveguide further having a plurality of alignment ferrules formed in a second end of the waveguide opposite the first end;
the light detector being affixed to the first end of the waveguide with the optical input substantially aligned with the first end of the light conducting core and the electrical terminal in electrical contact with the externally accessible electrical contact of the electrical conductor;
an integrated circuit including a receiver with electrical input and output terminals;
an electrical interconnect and mounting board including a first mounting area having the optical waveguide mounted thereon with the second end of the waveguide being positioned adjacent an external edge of the board and facing outwardly therefrom, a second mounting area having the integrated circuit mounted thereon and including electrical conductors extending from adjacent the first mounting area to adjacent the second mounting area, and the board further including electrical input and output terminals; and
the electrical conductors extending from adjacent the first mounting area to adjacent the second mounting area being connected in electrical contact with the electrical input terminal of the receiver and the externally accessible portion of the electrical conductor, and the electrical output terminal of the receiver being connected in electrical contact with an electrical output terminal of the electrical interconnect and mounting board.

14. An optical module as claimed in claim 13 wherein the receiver included in the integrated circuit is a non-linear burst mode data receiver.

15. An optical module as claimed in claim 14 wherein the receiver includes an input stage having an input terminal for receiving non-linear input signals and an output terminal supplying output signals indicative of the front and rear edges of non-linear input signals received, an amplifier coupled to receive the output signals from the input stage and provide amplified output signals at an output terminal thereof, and a hysteresis stage coupled to receive the amplified output signals from the output terminal of the amplifier and regenerate an amplified replica of the non-linear input signals.

16. An optical module comprising:
a light generator having an optical output and an electrical terminal positioned on a first surface thereof;
an optical waveguide including a first cladding layer, a second cladding layer affixed in overlying relationship on the first cladding layer, a light conducting core positioned between the first and second cladding layers and substantially surrounded thereby, the light conducting core having first and second ends optically accessible at opposite ends of the waveguide, an electrical conductor formed in the first cladding layer and having an externally accessible electrical contact positioned in a first end of the waveguide adjacent the first end of the associated light conducting core and an externally accessible portion positioned on an external surface of the first cladding layer, the waveguide further having a plurality of alignment ferrules formed in a second end of the waveguide opposite the first end;
the light generator being affixed to the first end of the waveguide with the optical output substantially aligned with the first end of the light conducting core and the electrical terminal in electrical contact with the externally accessible electrical contact of the electrical conductor;
an integrated circuit including a transmitter with electrical input and output terminals;
an electrical interconnect and mounting board including a first mounting area having the optical waveguide mounted thereon with the second end of the waveguide being positioned adjacent an external edge of the board and facing outwardly therefrom, a second mounting area having the integrated circuit mounted thereon and including electrical conductors extending from adjacent the first mounting area to adjacent the second mounting area, and the board further including electrical input and output terminals; and
the electrical conductors extending from adjacent the first mounting area to adjacent the second mounting area being connected in electrical contact with the electrical output terminal of the transmitter and the externally accessible portion of the electrical conductor, and the electrical input terminal of the transmitter being connected in electrical contact with an electrical input terminal of the electrical interconnect and mounting board.

17. An optical bus comprising:
first and second optical transceiver modules each having a plurality of transmit and receive channels, each transmit channel including a light generator having an optical output and an electrical terminal positioned on a first surface thereof and a transmitter with electrical input and output terminals, and each receive channel including a light detector having an optical input and an electrical terminal positioned on a first surface thereof and a receiver with electrical input and output terminals, a first integrated circuit including all of the transmitters and a second integrated circuit including all of the receivers, an optical waveguide including a first cladding layer, a second cladding layer affixed in overlying relationship on the first cladding layer, a plurality of spaced apart light conducting cores positioned between the first and second cladding layers and substantially surrounded thereby, the light conducting cores each having first and second ends optically accessible at opposite ends of the waveguide, a plurality of electrical conductors formed in the first cladding layer and each electrical conductor being associated with a different one of the plurality of light conducting cores and having an externally accessible electrical contact positioned in a first end of the waveguide adjacent the first end of the associated light conducting core and an externally accessible portion positioned on an external surface of the first cladding layer, the waveguide further having a plurality of alignment ferrules formed in a second end of the waveguide opposite the first end, each of the light detectors being affixed to the first end of the waveguide with the optical input substantially aligned with the first end of a light conducting core of the plurality of light conducting cores and the electrical terminal in electrical contact with the externally accessible electrical contact of the electrical conductor associated with the aligned light conducting core, each of the light generators being affixed to the first end of the waveguide with the optical output substantially aligned with the first end of a light conducting core of the plurality of light conducting cores and the electrical terminal in electrical contact with the externally accessible electrical contact of the electrical conductor associated with the aligned light conducting core, an electrical interconnect and mounting board including a first mounting area having the optical waveguide mounted thereon with the second end of the waveguide being positioned adjacent an external edge of the board and facing outwardly therefrom, a second mounting area having the first integrated circuit mounted thereon and including a plurality of electrical conductors extending from adjacent the first mounting area to adjacent the second mounting area, and a third mounting area having the second integrated circuit mounted thereon and including a plurality of electrical conductors extending from adjacent the first mounting area to adjacent the third mounting area, the board further including electrical input and output terminals, the electrical output terminal of each of the transmitters being connected in electrical contact with one of the plurality of electrical conductors extending from adjacent the first mounting area to adjacent the second mounting area and the electrical input terminal of each of the transmitters being connected in electrical contact with an electrical input terminal of the electrical interconnect and mounting board, the electrical input terminal of each of the receivers being connected in electrical contact with one of the plurality of electrical conductors extending from adjacent the first mounting area to adjacent the third mounting area and the electrical output terminal of each of the receivers being connected in electrical contact with an electrical output terminal of the electrical interconnect and mounting board, and leads electrically connecting the externally accessible portion positioned on an external surface of the first cladding layer of each of the plurality of electrical conductors formed in the first cladding layer to one of the plurality of electrical conductors extending from adjacent the first mounting area to adjacent the second mounting area and to adjacent the third mounting area;

an optical fiber ribbon with first and second ends and including a plurality of optical channels and a connector at each of the ends, which connectors are each formed with a plurality of outwardly extending pins that mate with the plurality of alignment ferrules in the optical waveguides, each light conducting core of the plurality of light conducting cores in the waveguides being optically aligned with an optical channel of the optical fiber ribbon with the outwardly extending pins engaged in the alignment ferrules.

18. An optical bus as claimed in claim 17 wherein the optical fiber ribbon and the connectors at each end include at least twenty channels.

19. An optical bus as claimed in claim 18 wherein the connectors at each end include two standard ten channel connectors joined by a flexible material.

20. A method of manufacturing an optical transceiver module comprising the steps of:

providing an optical waveguide with electrical contacts including first and second electrical conductors each having an externally accessible electrical contact positioned at an end of the optical waveguide and an externally accessible portion positioned on an external surface of the optical waveguide and a plurality of light conducting cores each having first and second ends optically accessible at first and second ends of the optical waveguide with the first end of each light conducting core being positioned adjacent an associated one of the externally accessible electrical contacts of the first and second electrical conductors at the first end of the Optical waveguide, and alignment ferrules substantially parallel with and spaced from the light conducting cores and opening at the second end of the optical waveguide;

providing a first package including a light detector and having an optical input and an electrical terminal positioned on a first surface thereof, the first package being affixed to the first end of the optical waveguide with the optical input substantially aligned with the first end of a first light conducting core of the plurality of light conducting cores and the electrical terminal in electrical contact with the externally accessible electrical contact of the electrical conductor associated with the first light conducting core;

providing a second package including a light generator and having an optical output and an electrical terminal positioned on a first surface thereof, the second package being affixed to the first end of the optical waveguide with the optical output substantially aligned with the first end of a second light conducting core of the plurality of light conducting cores and the electrical terminal in electrical contact with the externally accessible electrical contact of the electrical conductor associated with the second light conducting core;

providing a first integrated circuit including a transmitter with electrical input and output terminals and a second integrated circuit including a receiver with electrical input and output terminals;

providing an electrical interconnect and mounting board having first, second and third mounting areas with a first electrical conductor extending between the first and second areas and a second electrical conductor extending between the first and third areas;

positioning the optical waveguide on the first mounting area of the electrical interconnect and mounting board with the second end of the optical waveguide being adjacent an external edge of the board and facing outwardly therefrom, positioning the first integrated circuit on the second mounting area and the second integrated circuit on the third mounting area;

connecting the first electrical conductor extending between the first and second areas to the electrical output terminal of the transmitter and to the externally accessible portion of the electrical conductor associated with the first light conducting core and connecting the electrical input terminal of the transmitter to an electrical input terminal of the electrical interconnect and mounting board, connecting the second electrical conductor extending between the first and third areas to the electrical input terminal of the receiver and to the externally accessible portion of the electrical conductor associated with the second light conducting core and connecting the electrical output terminal of the receiver to an electrical output terminal of the electrical interconnect and mounting board; and encapsulating the electrical interconnect and mounting board and assembled components.

21. A method of manufacturing an optical transceiver module as claimed in claim 20 wherein the steps of providing a first package including a light detector and providing a second package including a light generator include the step of providing the first and second packages in a single unit.

22. A method of manufacturing an optical transceiver module as claimed in claim 20 wherein the steps of providing a first and a second integrated circuit includes providing both the first and second integrated circuits on a single semiconductor chip.

23. A method of manufacturing an optical transceiver module as claimed in claim 20 wherein the step of providing a second integrated circuit including a receiver includes the steps of producing an input stage having an input terminal for receiving non-linear input signals and an output terminal supplying output signals indicative of the front and rear edges of non-linear input signals received, producing an amplifier coupled to receive the output signals from the input stage and provide amplified output signals at an output terminal thereof, and producing a hysteresis stage coupled to receive the amplified output signals from the output terminal of the amplifier and regenerate an amplified replica of the non-linear input signals.

24. A method of manufacturing an optical transceiver module comprising the steps of:

manufacturing an optical waveguide with electrical contacts including the steps of molding a first cladding layer with an inner surface and first and second electrical conductors positioned in the first cladding layer, the first and second electrical conductors each having an externally accessible electrical contact positioned at an end of the first cladding layer and an externally accessible portion positioned on an external surface of the first cladding layer, molding a second cladding layer with a plurality of channels in an inner surface thereof, affixing the inner surface of the first cladding layer in overlying relationship on the inner surface of the second cladding layer so as to form a plurality of light conducting cores positioned between the first and second cladding layers and substantially surrounded thereby, each of the light conducting cores having first and second ends optically accessible at first and second ends of the optical waveguide with the first end of each of the light conducting cores being positioned adjacent an associated one of the externally accessible electrical contacts of the first and second electrical conductors at the first end of the optical waveguide, and forming alignment ferrules at least partially in one of the first and second cladding layers, the alignment ferrules being substantially parallel with and spaced from the channels and opening at the second end of the optical waveguide;

providing a first package including a light detector and having an optical input and an electrical terminal positioned on a first surface thereof, the first package being affixed to the first end of the waveguide with the optical input substantially aligned with the first end of a first light conducting core of the plurality of light conducting cores and the electrical terminal in electrical contact with the externally accessible electrical contact of the electrical conductor associated with the first light conducting core;

providing a second package including a light generator and having an optical output and an electrical terminal positioned on a first surface thereof, the second package being affixed to the first end of the waveguide with the optical output substantially aligned with the first end of a second light conducting core of the plurality of light conducting cores and the electrical terminal in electrical contact with the externally accessible electrical contact of the electrical conductor associated with the second light conducting core;

providing a first integrated circuit including a transmitter with electrical input and output terminals and a second integrated circuit including a receiver with electrical input and output terminals;

providing an electrical interconnect and mounting board having first, second and third mounting areas with a first electrical conductor extending between the first and second areas and a second electrical conductor extending between the first and third areas;

positioning the optical waveguide on the first mounting area of the electrical interconnect and mounting board with the second end of the waveguide being adjacent an external edge of the board and facing outwardly therefrom, positioning the first integrated circuit on the second mounting area and the second integrated circuit on the third mounting area;

electrical connecting the first electrical conductor extending between the first and second areas to the electrical output terminal of the transmitter and to the externally accessible portion of the electrical conductor associated with the first light conducting core and electrical connecting the electrical input terminal of the transmitter to an electrical input terminal of the electrical interconnect and mounting board, electrical connecting the second electrical conductor extending between the first and third areas to the electrical input terminal of the receiver and to the externally accessible portion of the electrical conductor associated with the second light conducting core and electrical connecting the electrical output terminal of the receiver to an electrical output terminal of the electrical interconnect and mounting board; and encapsulating the electrical interconnect and mounting board and assembled components.

25. A method of manufacturing an optical transceiver module as claimed in claim 24 wherein the step of providing a second package including a light generator includes providing an ultra-low threshold laser as the light generator.

26. A method of manufacturing an optical transceiver module as claimed in claim 25 wherein the step of providing a first integrated circuit including a transmitter includes providing a single gate circuit as the transmitter.

27. A method of manufacturing an optical transceiver module as claimed in claim 24 including in addition the step of manufacturing the optical waveguide, the first package and the second package as a separate optical interface containing all optical/electrical and electrical/optical conversions for the optical transceiver module.

* * * * *